(12) United States Patent
Kozloski et al.

(10) Patent No.: US 10,375,105 B2
(45) Date of Patent: Aug. 6, 2019

(54) BLOCKCHAIN WEB BROWSER INTERFACE

(71) Applicant: International Business Machines Corporation, Armonk, NY (US)

(72) Inventors: James R. Kozloski, New Fairfield, CT (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 15/448,995

(22) Filed: Mar. 3, 2017

(65) Prior Publication Data
US 2018/0255090 A1   Sep. 6, 2018

(51) Int. Cl.
*H04L 29/06* (2006.01)
*H04L 29/08* (2006.01)
*H04L 9/06* (2006.01)

(52) U.S. Cl.
CPC ........ *H04L 63/1433* (2013.01); *H04L 9/0637* (2013.01); *H04L 63/145* (2013.01); *H04L 63/1416* (2013.01); *H04L 67/02* (2013.01); *H04L 67/22* (2013.01); *H04L 67/10* (2013.01); *H04L 67/104* (2013.01)

(58) Field of Classification Search
CPC ... H04L 63/1433; H04L 67/104; H04L 67/02; H04L 63/145; H04L 9/0637
USPC .............................................. 726/25, 26, 30
See application file for complete search history.

(56) References Cited

U.S. PATENT DOCUMENTS

| | | | |
|---|---|---|---|
| 6,073,241 A | 6/2000 | Rosenberg et al. | |
| 7,552,081 B2 | 6/2009 | Dutta et al. | |
| 8,763,136 B2 | 6/2014 | Li | |
| 9,137,319 B2 | 9/2015 | Xu et al. | |
| 9,990,418 B1 * | 6/2018 | Rogers ................. | G06Q 20/145 |
| 2008/0162292 A1 | 7/2008 | Hanif et al. | |
| 2010/0138437 A1 | 6/2010 | Nadig et al. | |
| 2014/0279623 A1 | 9/2014 | Mislove et al. | |
| 2015/0206106 A1 | 7/2015 | Yago | |
| 2015/0332283 A1 | 11/2015 | Witchey | |

(Continued)

FOREIGN PATENT DOCUMENTS

| | | |
|---|---|---|
| WO | 2015024129 A1 | 2/2015 |
| WO | 2015085393 A1 | 6/2015 |
| WO | 2016022864 A3 | 2/2016 |

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Jahangir Kabir
(74) *Attorney, Agent, or Firm* — Law Office of Jim Boice

(57) ABSTRACT

A computer-implemented method records and maintains a record of browser events in a blockchain using a peer-to-peer network. One or more processors detect one or more browser events for a browser on a computer. One or more processors then transmit transactions that are associated with the one or more browser events from the computer to a peer-to-peer network of devices that create a blockchain, which includes one or more blocks that describe the one or more browser events, such that the blockchain records and maintains a record of browser events that occur at the computer.

18 Claims, 11 Drawing Sheets

(56) References Cited

U.S. PATENT DOCUMENTS

| | | | |
|---|---|---|---|
| 2017/0221029 A1* | 8/2017 | Lund | G06Q 20/123 |
| 2017/0295180 A1* | 10/2017 | Day | G07C 9/00309 |
| 2017/0324738 A1* | 11/2017 | Hari | H04L 61/1511 |
| 2018/0150835 A1* | 5/2018 | Hunt | H04L 67/104 |
| 2018/0197186 A1* | 7/2018 | Sheerin | G06Q 30/0185 |

OTHER PUBLICATIONS

Olga Kharif, "Blockchain Goes Beyond Crypto-Currency". Bloomberg L.P., May 19, 2016. bloomberg.com, Web. Oct. 26, 2016. <http://www.bloomberg.com/news/articles/2016-05-19/built-for-bitcoin-blockchain-goes-beyond-crypto-currency>.

S. Brakeville et al., "Blockchain Basics: Introduction to Business Ledgers", IBM Corporation, Developerworks, 2016, pp. 1-6.

\* cited by examiner

BLOCKCHAIN WEB BROWSER INTERFACE

BACKGROUND

The present invention relates to the field of telecommunication devices, and particularly to telecommunication devices that are capable of browsing the World Wide Web. Still more particularly, the present invention relates to logging browser events on a computer in a distributed manner.

SUMMARY

In one or more embodiments of the present invention, a computer-implemented method records and maintains a record of browser events in a blockchain using a peer-to-peer network. One or more processors detect one or more user's browser events for a browser on a computer. One or more processors then transmit transactions associated with the one or more user's browser events from the computer to a peer-to-peer network of devices that create a blockchain, which includes one or more blocks that describe the one or more user's browser events, such that the blockchain ledgers and maintains a record of historical user's browser events that occur at the computer.

In an embodiment of the present invention, a computer-implemented method tracks and maintains a record of disparate browser events. One or more processors detect a browser event for a browser on a computer. One or more processors transmit transactions associated with the disparate browser events from the computer to a trans-vendor service, which operates across disparate browsers, devices, and operating systems, such that the trans-vendor service generates a blockchain ledger that includes one or more blocks that comprise the transactions associated with one or more user browser events from the computer and blocks that describe the one or more user browser events from the disparate browsers, devices, and operating systems.

The described inventions may also be implemented in a computer system and/or as a computer program product.

DETAILED DESCRIPTION

Figure 1:
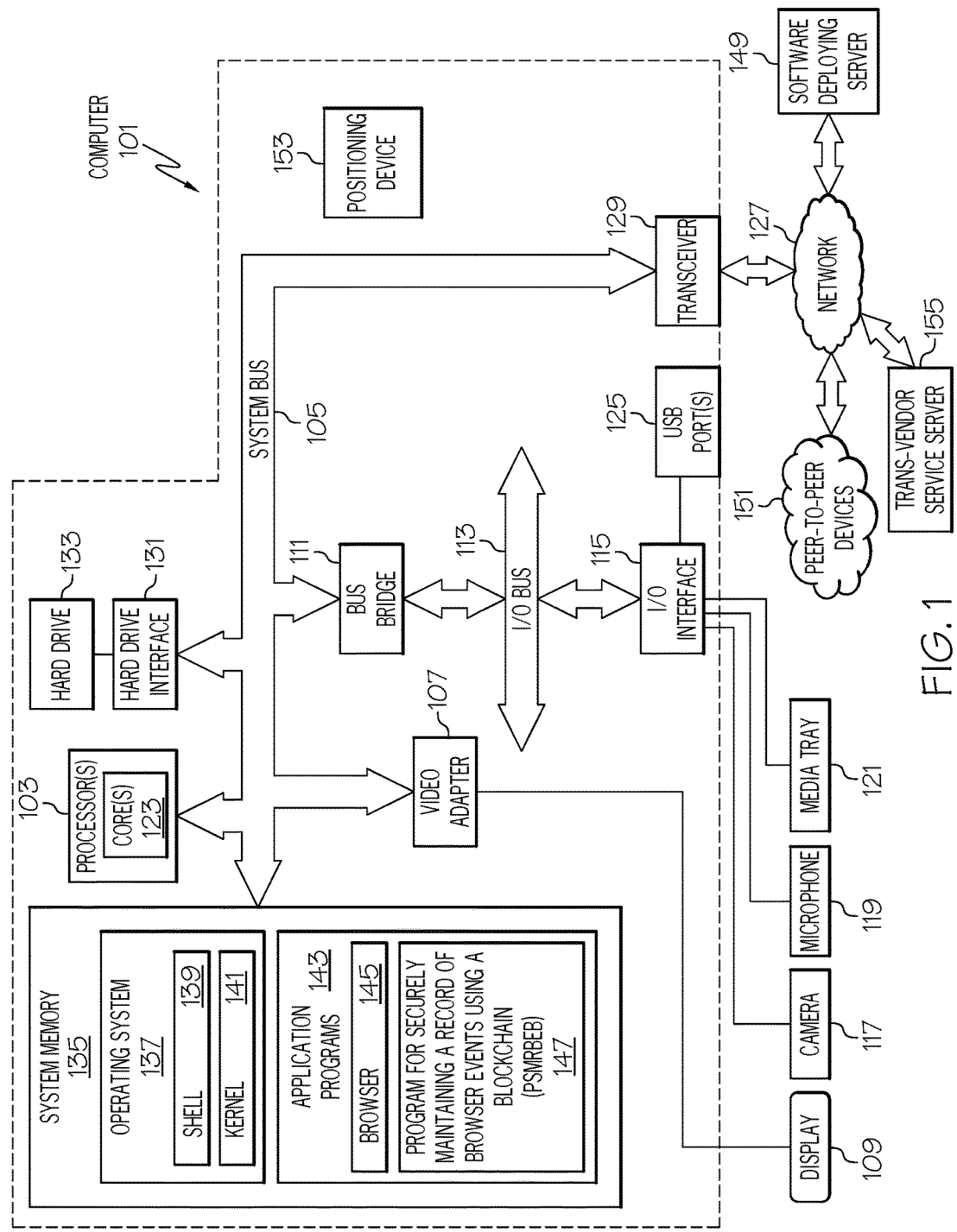
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or peer-to-peer devices 151 and/or trans-vendor service server 155 shown in FIG. 1, and/or peers 501a-501d shown in FIG. 5, and/or clients 601a-601n and/or non-validating peers 604a-604n and/or validating peers 608a-608n shown in FIG. 6.

Exemplary computer 101 includes one or more processor(s) 103 that are coupled to a system bus 105. Processor(s) 103 may each utilize one or more core(s) 123, which contain execution units and other hardware beyond that found in the rest of the processor(s) 103 (e.g., on-board random access memory, etc.). A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117, a microphone 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as peer-to-peer devices 151 and trans-vendor service server 155, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Securely Maintaining a Record of Browser Events using a Blockchain (PSMRBEB) 147. PSMRBEB 147 includes code for implementing the processes described below, including those described in FIGS. 2-8. In one embodiment, computer 101 is able to download PSMRBEB 147 from software deploying server 149, including in an on-demand basis, wherein the code in PSMRBEB 147 is not downloaded until needed for execution. In one embodiment of the present invention, software deploying server 149 performs all of the functions associated with the present invention (including execution of PSMRBEB 147), thus freeing computer 101 from having to use its own internal computing resources to execute PSMRBEB 147.

Also within computer 101 in one or more embodiments of the present invention is a positioning device 153, which provides sensor readings describing a real-time position of computer 101. Exemplary embodiments of positioning device 153 incorporate the use of accelerometers, global positioning system (GPS) sensors, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention provides Web browsing security while also giving the user more control. For a user (or more specifically the events/conditions related to a Web browser), bookmarks, searches, websites (i.e., associated with specific uniform resource locator—URLs) visited, etc. are stored in a block. The block is anchored to a user and stores the user's browser events through time in a secure manner. The present invention then uses blockchain technology to securely track and maintain a record of Web browser events. Browser transactions associated with a user/stakeholder are compiled into a chain of browser transaction blocks (referred to herein as a "ledger"). Thus, the chain and/or blockchain can be considered a chronicle of the user's browser path through time. When a transaction occurs, one or more corresponding browser parameters (e.g., including the user's added bookmarks, searches, URLs visited, etc.) are sent to one or more validation modules. These validation modules establish a validity of the transaction and generate a new block. Once the new block has been calculated it is appended to the user/stakeholder's browser historic blockchain.

A transaction (that is added to the block) may be any Web browser event associated with a user. Such items include: user bookmarks, search words (e.g. in a word-based search engine), history of URLs visited, time, geolocation, device used, internet protocol (IP) address of the user's computer, textual content typed into entry forms, default/user settings (e.g., browser security settings), etc. One or more of items are securely stored in a growing block. If storing too much of this information is deemed too sensitive or unsecure, the user or system may optionally restrict content to less sensitive items like bookmarks.

Figure 2:
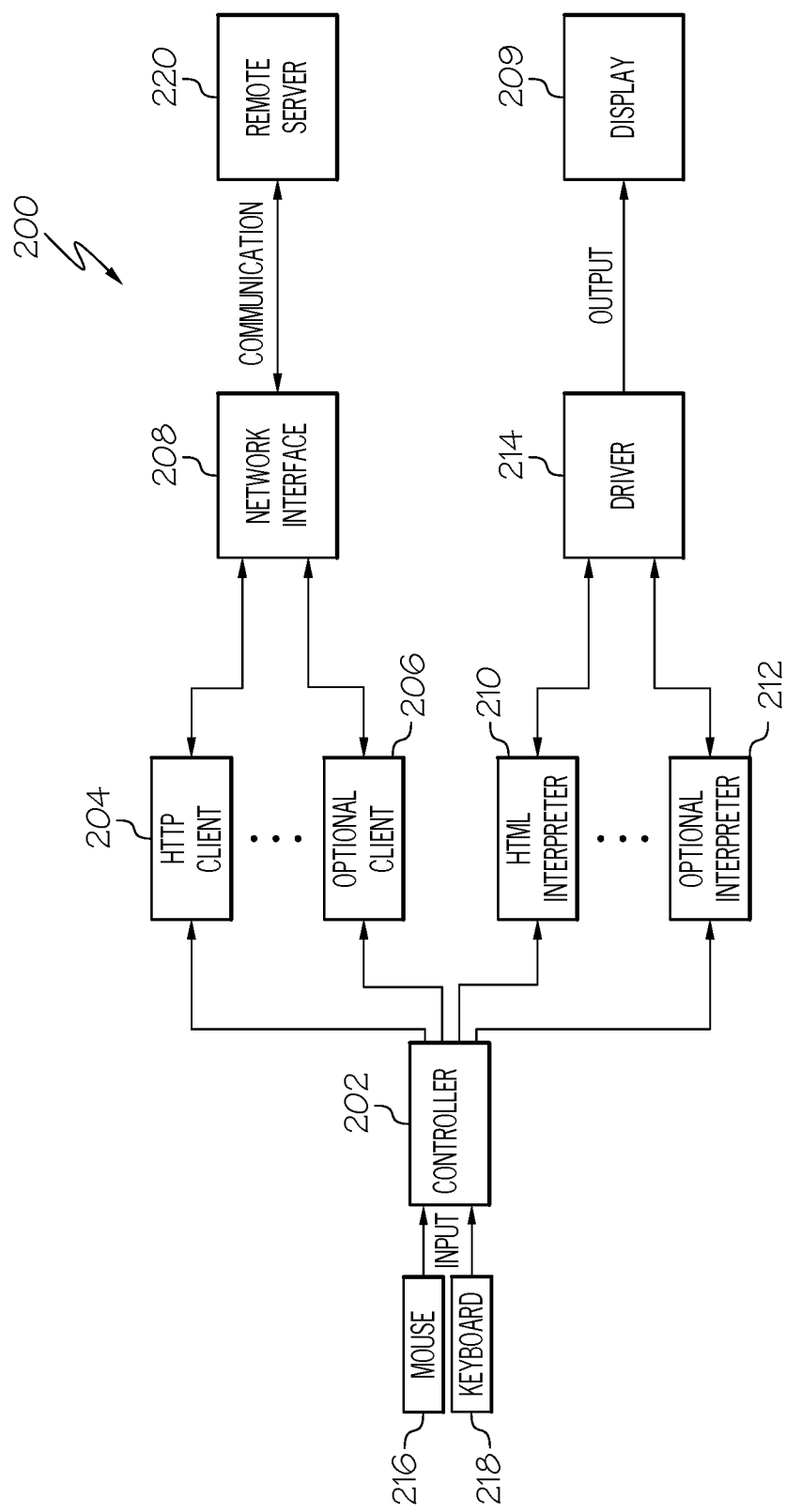
FIG. 2 illustrates a browser used in one or more embodiments of the present invention.

With reference now to FIG. 2, an exemplary browser 200 as used in one or more embodiments of the present invention is presented.

A controller 202 receives an input from a mouse 216 and/or keyboard 218 indicating what the user is searching for (e.g., a particular subject). The controller 202 communicates with a hypertext transfer protocol (HTTP) client 204 (and/or an optional client 206 that is not HTTP-based), which interacts with a network interface 208, which retrieves webpages from a remote webpage server 220.

The controller 202 also communicates with a HyperText Markup Language (HTML) interpreter 210 (and/or an optional interpreter 212 that is not HTML-based), which directs a driver 214 to display content (including webpages) on the user's computer display 209.

In one or more embodiments of the present invention, a graphical user interface (GUI) is used to control what and when something is stored in the block. Alternatively, the use of the block(s) is automatic by enforcing appropriate access control principles.

Figure 3:
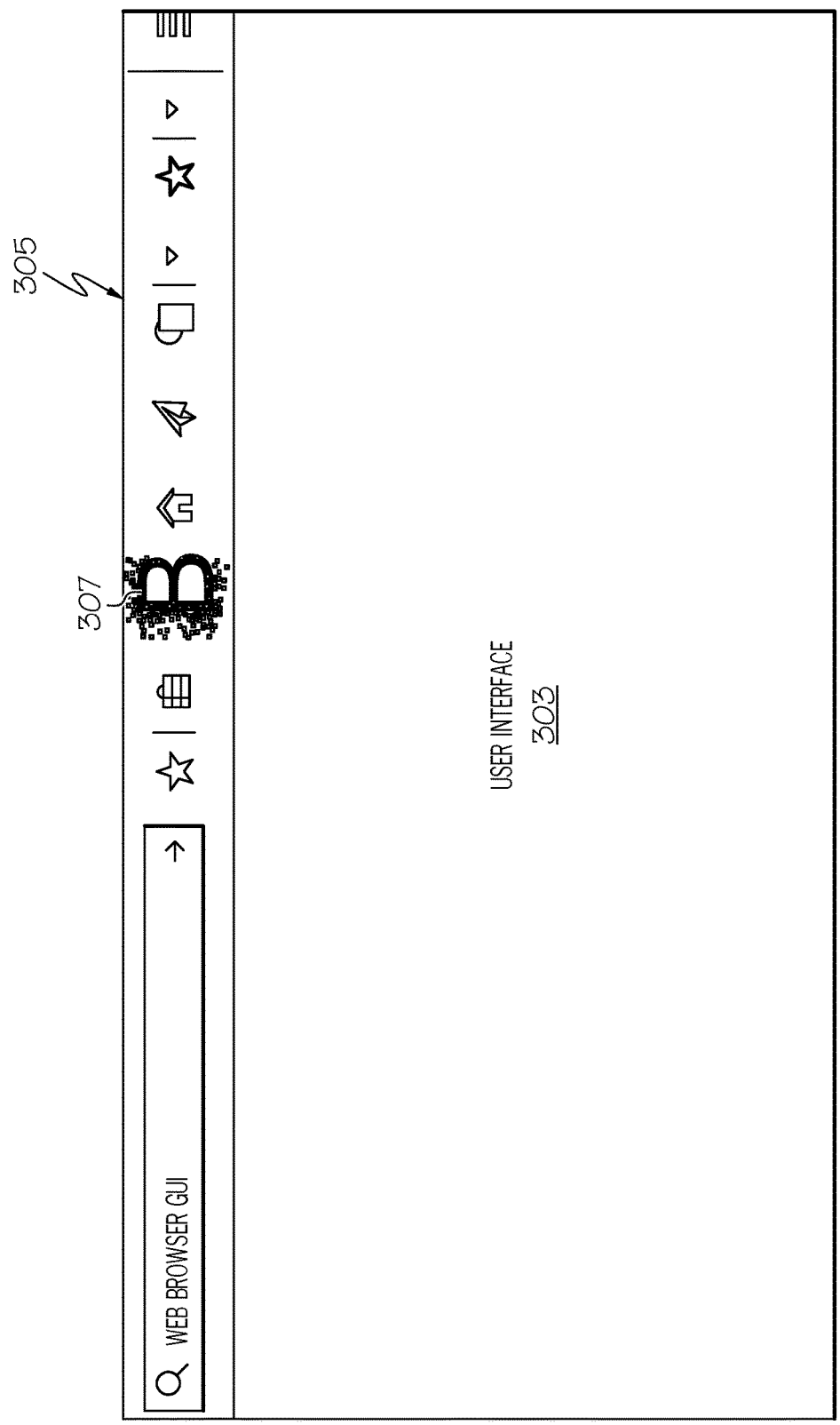
FIG. 3 depicts an exemplary user interface with a blockchain enabling button as used in one or more embodiments of the present invention.

Thus and with reference now to FIG. 3, a user interface 303 includes a toolbar 305. The present invention adds a unique blockchain enabling button 307 that, when activated (e.g., clicked with a mouse) causes the system to store browser events on a blockchain as described herein. This way the GUI may present as an optional blockchain button, giving a user control over whether to enter blockchain mode or to change the frequency with which events to the block are recorded.

As described herein, the blockchain ledger is made of blocks that describe various historical user's browser content (e.g., transactions, parameters, etc. for a particular user). Thus, content that may be added to a block may relate to a browser cache, browser tabs, cookies, version of the browser, a browser mode (private vs. public), browser plugin/extensions and application programming interfaces (APIs) information, a privilege level of a browser API or a plugin/extension API, browser mode of access (mobile or web), changing/resetting passwords on web browser, etc.

Furthermore and in one or more embodiments of the present invention, content may be added to the block when a user: browses the web, visits a web site, adds a bookmark, speaks a command, performs a gesture, performs a task, browses the web in a certain geolocation, selects a browser GUI element to add to the block, updates the browser version, installs/updates a plugin/extension, adds a security patch, etc. In one or more embodiments, this block addition is performed only in certain scenarios/settings (work/home/office/government location/on behalf of another person).

The rate of addition of information to a block may optionally automatically change by a risk assessment or forecast. For example, the rate may change in a setting where some kind of risk (e.g., vulnerability analysis of plugin/extension code) may be forecast to increase. For instance, this may optionally depend on the risk level or importance of the site being browsed (e.g., logging onto and browsing on banking site, accessing personal healthcare, etc.).

The content that is added to a block/blockchain may be a scalar or vector quantity (e.g. multidimensional). For example, one or more risk characteristics or risk based on needs may have more than one dimension.

The kind or nature of the added content may be changed by some context, such as work browsing vs. home, "In Private" browsing vs. normal browsing, types and purpose of browsing (e.g. browsing for banking, healthcare, etc.).

The content may be added to the block in real-time, as a user browses the Web.

Thus, the present invention affords a system for storing browsing information such that privacy is preserved and places privacy in the "hands of a user" rather than a third party.

In one embodiment, the system and method of validating and determining the sensitivity of information may use information security such as that obtained from a vulnerability analysis, a taint analysis, an information flow security analysis, etc. That is, the chaincodes for validating transactions implement business logic(s) for tracking and validating unsafe or malicious browser/code extensions that may allow attackers to run their own code in the victim's browser with elevated privileges.

In accordance with one or more embodiments of the present invention, validating the browser transactions uses a set of browser tokens representative of user or browser activities taken with respect to a browser (including critical APIs, browser extension APIs, etc.). The browser tokens may include inputs such as user generated queries (including user interactions with a web browser interface), program/service execution results (e.g. vulnerability scanner, information flow analysis, malware detection tools, response to a user query, etc.), user cohort and context; output such as risk assessment, forecast, etc.

Thus in one or more embodiments of the present invention, the validation device is configured for: obtaining a historical block identifier from a browser historic blockchain representative of historical activities the user conducted with respect to the browser; receiving one or more validity requirements with respect to the user activities on the browser; obtaining a validation token indicative of a validity of the user actions and based on the set of browser tokens comprising one or more inputs (such as user generated queries (including user interactions with web browser interface), program/service execution results (e.g. vulnerability scanner, information flow analysis, malware detection tools, response to a user query, etc.), user cohort and context, and outputs (risk assessment such as data sensitivity, forecast of leaking sensitive information based on the browser plugin/extension); and/or computing the chaincode block for a transaction against said validation requirement as a function of the following browser parameters: the validation token, historical browser's block identifier, the set of browser tokens.

In one embodiment of the present invention, the rate of transaction validation and rate of adding blocks are determined based on context analysis of the user/browser data, criticality of browser APIs (e.g., API to store and retrieve user credentials such as passwords on filesystem), privileged extension APIs, etc.

In one or more embodiments, the present invention employs a method and system for detecting or predicting privacy and security breaches based on the user browsing history, cohort (user roles—e.g. government officials, user expertize level, user past browsing history, etc.) and context (e.g. banking, healthcare) by obtaining historical browser's block identifiers. The detection or prediction of a privacy or security breach may be based on real-time advanced vulnerability scanning and malicious intent detection algorithms (including learning based methods).

In one or more embodiments, the present invention tracks and stores a device history of the browser running on a mobile device or on a desktop environment. The browsing history of the user on mobile or web or any other device will be stored on the user browser history blockchain. This will allow the user to utilize data collected and stored on the ledger from any device.

In one or more embodiments of the present invention, a trans-vendor service is used to provide browsing data across different Web browsers.

Figure 4:
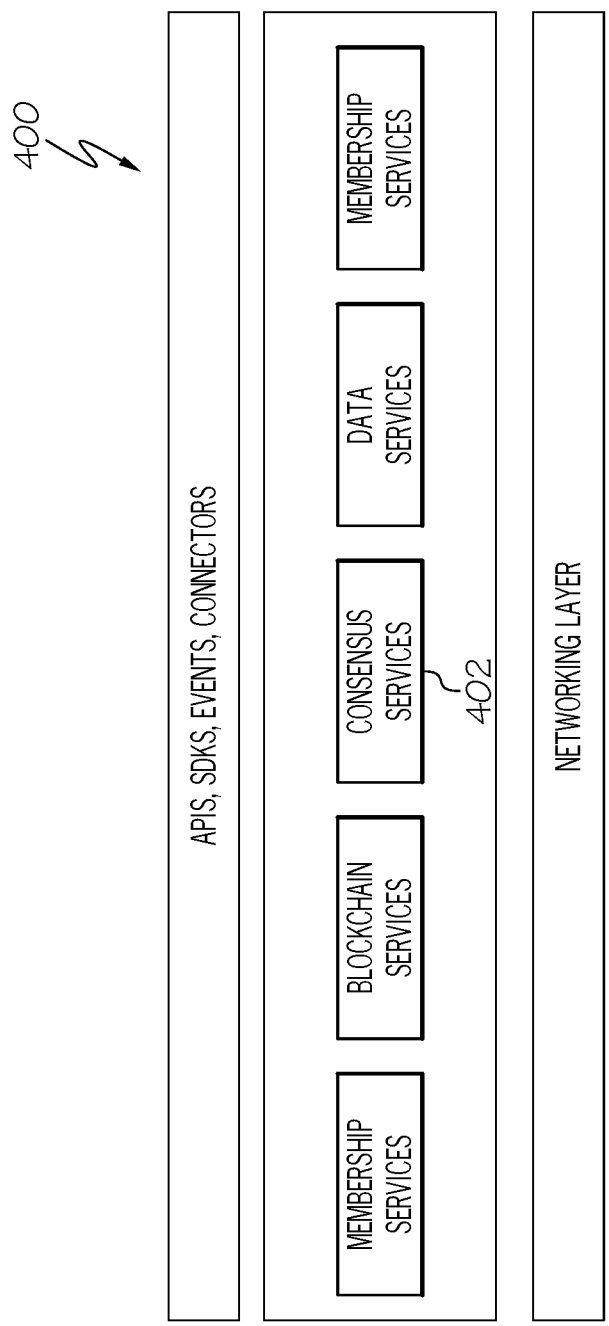
FIG. 4 illustrates an exemplary blockchain architecture as used in one or more embodiments of the present invention.

In one or more embodiments of the present invention, a blockchain fabric, such as blockchain fabric 400 depicted in FIG. 4, is used to provide the infrastructure (e.g. execution of the chaincodes) and services (e.g., Membership services such as Identify management) for securely and transparently storing, tracking and managing transactions on a "single point of truth", that is, historical records related to browser events. The blockchain fabric 400 maintains a verifiable record (of the single point of truth) of every single transaction ever made within the system. Once data are entered onto the blockchain, they can never be erased (immutability) or changed, a change to a record is regarded as issuing/introducing a new transaction, thus ensuring auditability and verifiability of data.

The blockchain fabric 400 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism (e.g., consensus services 402) incorporating a majority of the participants in the system. This allows the participating entities to know for certain that a digital event (transaction) happened by creating an irrefutable record in a permissioned public ledger.

As mentioned above, transactions associated with an entity (e.g., a user's browser events on a Web browser interface) are compiled into a chain of "transaction blocks" that constitutes the lifelong record of what has happened to that entity. The chain can be considered a chronicle of a browser's path through time.

Figure 5:
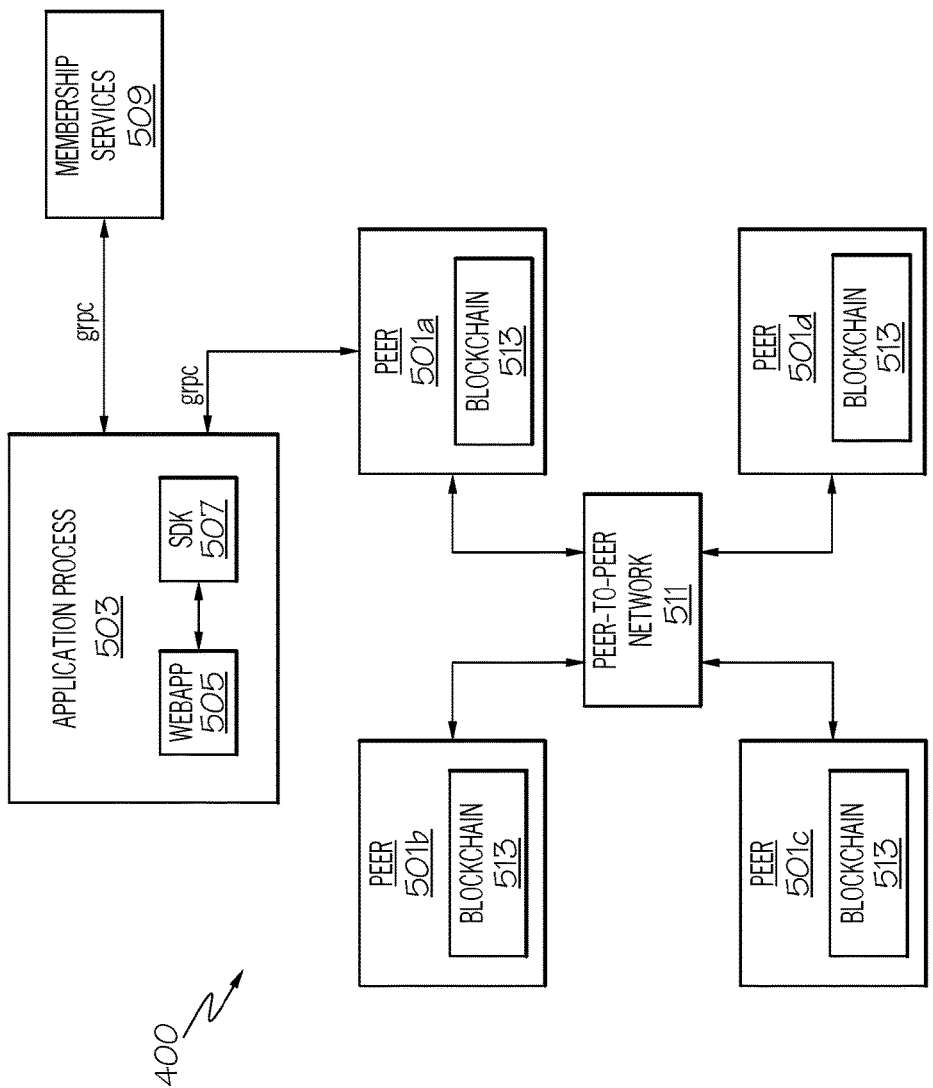
FIG. 5 depicts an exemplary blockchain topology as used in one or more embodiments of the present invention.

When a transaction is executed, its corresponding chaincode is executed by several validating peers of the system, as shown in the depiction of blockchain fabric 400 in FIG. 5.

Thus, as shown in FIG. 5, peers 501a-501d (i.e., other computers, smartphones, servers, etc.) establish the validity of the transaction parameters and, once they reach consensus, a new block is generated and appended onto the blockchain network. That is, an application process 503 running on a smart phone or other device utilizing a browser executes an application such as the depicted WebApp 505, causing a software development kit (SDK) 507 to communicate using general remote procedure calls (grpc) to membership services 509 that support the peer-to-peer network 511 that supports the blockchain 513 using the peers 501a-501d.

Thus, the open blockchain fabric 400 shown in FIG. 4 and FIG. 5 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

Figure 6:
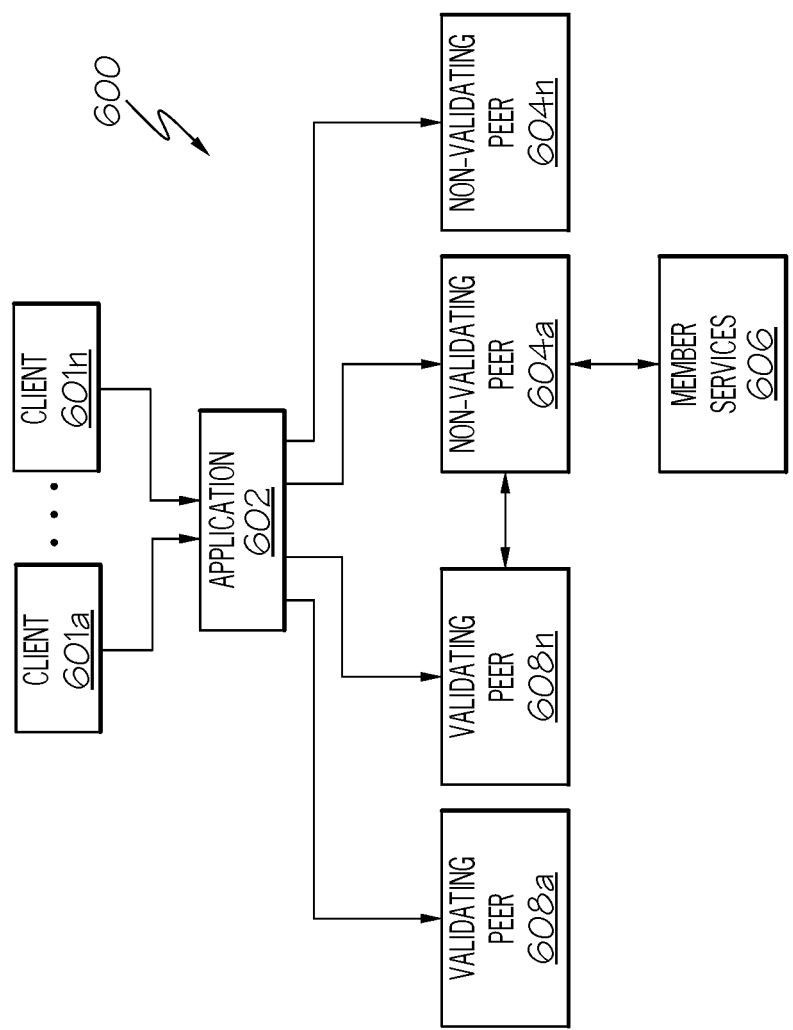
FIG. 6 depicts a deployment of a blockchain using multiple validating peers in accordance with one or more embodiments of the present invention.

Solutions built on the open blockchain fabric 400 can be broken down into several components shown in FIG. 6: member services 606 (analogous to membership services 509 shown in FIG. 5), validating peers 608a-608n (one or more of the peers 501a-501d shown in FIG. 5), non-validating peers 604a-604n (one or more of the peers 501a-501d shown in FIG. 5), and an application 602 (analogous to application process 503 shown in FIG. 5) used by clients 601a-601n.

In the context of the proposed system for smart phone event management, there can be multiple blockchains (e.g., phone history blockchain, contact record blockchain, text messages blockchain, etc.), each one having its own operating parameters and security requirements.

Member services 606 manages data access.

Validating peers 608a-608n are designated nodes that participate in consensus algorithms. They are responsible for validating the data that gets persisted on the blockchain and also for the execution of logic called chaincode against the data contained in the ledger.

Non-validating peers 604a-604n maintain request services from member services 606 and validating peers 608a-608n on behalf of external client applications (application 602). In one or more embodiments of the invention, non-validating peers 604a-604n may be optionally used, with application 602 capable of direct communication with validating peers 608a-608n.

A blockchain is a distributed database that maintains a continuously-growing list of data records hardened against tampering and revision. It consists of data structure blocks—which may exclusively hold data in initial blockchain implementations, and in another embodiment, both data and programs—with each block holding batches of individual transactions and the results of any blockchain executables. Each block contains a timestamp and information linking it to a previous block.

Figure 11:
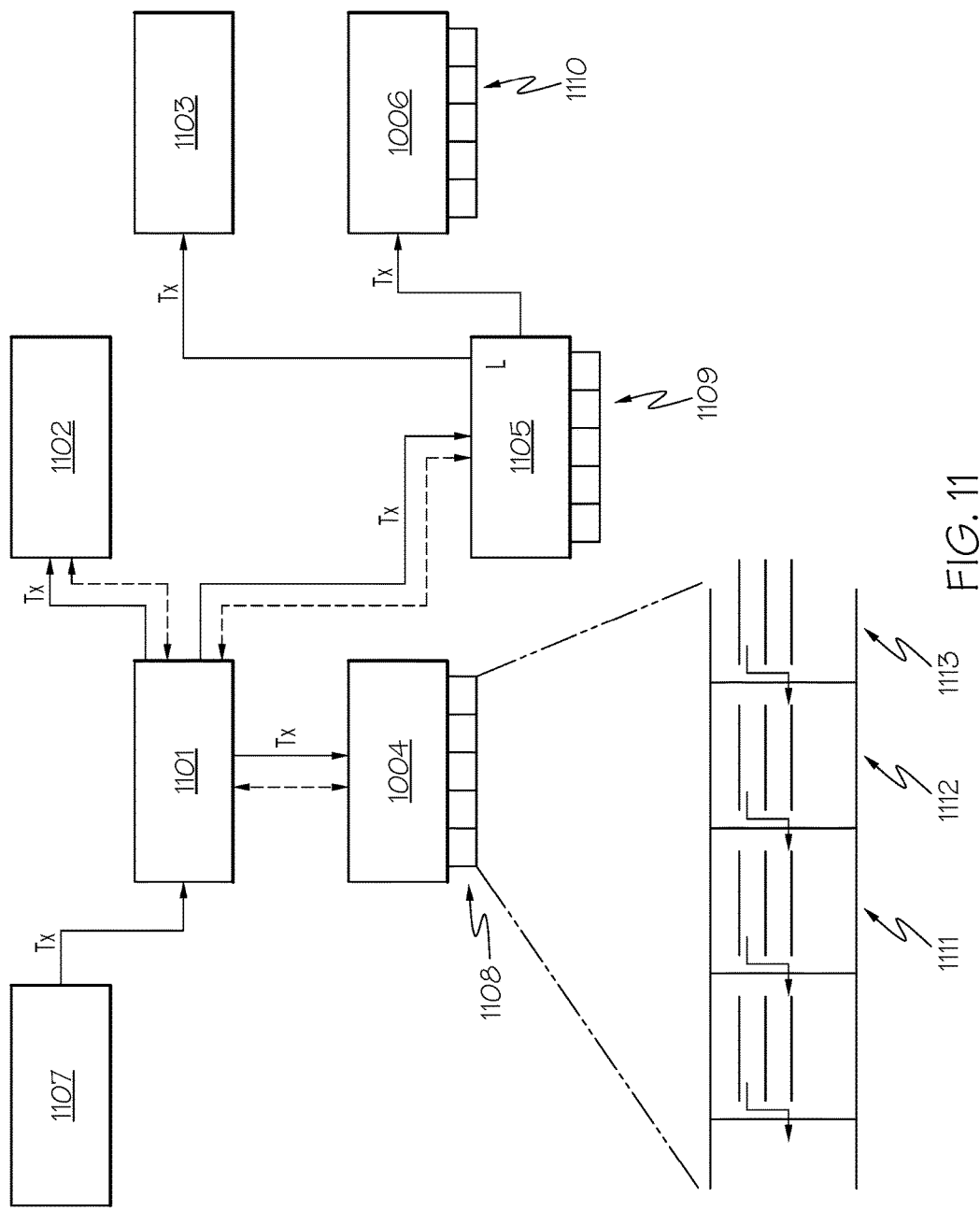
FIG. 11 illustrates a description of an exemplary blockchain as used in one or more embodiments of the present invention.

With reference now to FIG. 11, an illustration of exemplary blockchains as used in one or more embodiments of the present invention is presented. As shown in FIG. 11, computers 1101, 1102, 1103, 1104, 1105, and 1106 represent an exemplary peer-to-peer network of devices used to support a peer blockchain (in which more or fewer computers/machines may form the peer-to-peer network of devices). Each of the computers 1101, 1102, 1103, 1104, 1105, and 1106 in the peer-to-peer network has a same copy of data (e.g., data that represents browser events), as held in ledgers stored within the depicted blockchains 1108, 1109, 1110 that are associated with respective computers 1104, 1105, 1106.

As shown in FIG. 11, a client 1107 (e.g., the browser) sends a transaction Tx (e.g., an event that occurred with the browser) to the client's peer (depicted as computer 1101). Computer 1101 then sends the transaction Tx to ledgers known as the depicted blockchains 1108, 1109, 1110 that are associated with other peers, including the depicted computers 1102, 1104, 1105.

Blocks within exemplary blockchain 1108 are depicted as block 1111, block 1112, and block 1113. Block 1113 is depicted as a newest entry into ledger 1108, and includes not only the newest transactions but also a hash of the data from the older block 1112, which includes a hash of the even older block 1111. Thus, oldest blocks are made even more secure each time a new block is created, due to the hashing operations.

As shown in FIG. 11, computer 1105 has been designated as a leader peer according to a consensus model of the peer-to-peer network. As such, the leader peer (computer 1105) organizes all transactions from the nodes/peers/computers 1101-1106, and then shares new blocks/transactions (Tx) with other nodes (e.g., computers 1103, 1106) as depicted. The nodes/computers that receive the new block/transaction (Tx) then validate the new block/transaction. If enough (i.e., some predefined quantity/percentage) of the nodes/computers validate the new block/transaction, then the new block/transaction is deemed valid for the entire peer-to-peer network of computers 1101-1106 and is added to the blockchains (including the depicted blockchains 1108, 1109, 1110) associated with all of the nodes/peers/computers 1101-1106.

Thus, a blockchain serves as a public ledger of all transactions in a series using a peer-to-peer network/registry. This allows users to connect to the network/registry in order to send new transactions to the blockchain, in order to verify transactions, create new blocks, etc.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

Transactions are the content that is stored in the blocks in the blockchain. The validating peers 608 in the blockchain confirm that the transactions are valid (i.e., legitimate). That is, the system implementing the blockchain defines a valid transaction. In one or more embodiments of the present invention, a valid transaction is digitally signed.

Blocks contain a description of the transactions. Blocks are created by users known as "miners" who use specialized software or equipment designed specifically to create blocks. In a web browser security system, miners may be non-validating peers 604 or validating peers 608.

Thus, the open blockchain fabric 400 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

Other parameters stored in the block may include a domain name, a unique identification code for a web browser, etc. Fragments of cached web pages from a user device may be added.

Further and in one or more embodiments, the present invention supports a browser privacy mode in a plugin of the browser, which may use blockchain. Even if using this mode triggers locally cached data to exist entirely in volatile memory without saving to persistent storage, the block can be updated with some portions of this information. In this way, standard opt-in privacy methods which are broad and catch-all (e.g., cookies enablement) can be specified for only certain marketing, vendor, or web service providers. Cookies can then be granted access to the block chain based on a key or other de-encryption mechanism, allowing individuals to control their own private web browsing data using block-chain.

Figure 7:
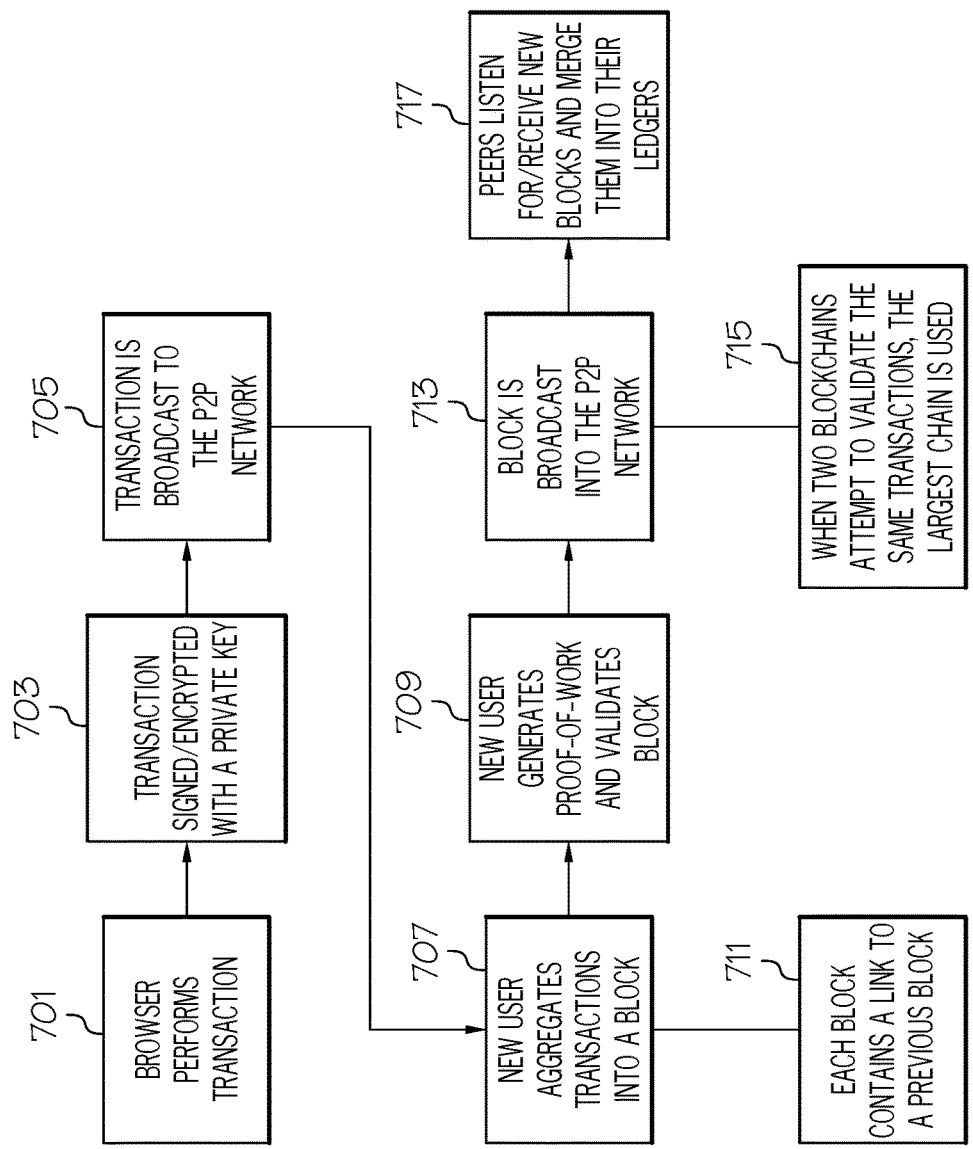
FIG. 7 illustrates a high-level overview of one or more embodiments of the present invention.

With reference now to FIG. 7, a high-level overview of one or more embodiments of the present invention is presented.

As shown in block 701, a browser performs a transaction (e.g., retrieves a webpage, searches for a term, stores a cookie, etc.).

As shown in block 703, the user then signs/encrypts the transaction using a private key, and broadcasts the signed/encrypted transaction to a peer-to-peer network (e.g., peer-to-peer network 511 shown in FIG. 6), as described in block 705.

Thus, the actions performed in blocks 701, 703, and 705 are performed on the computer that is running the browser.

As shown in block 707, a new user (e.g., one of the peers 501a-501d shown in FIG. 5) then aggregates transactions into a "block" (i.e., a block that contains a description of the transaction created in block 701). As shown in block 709, a new user (preferably a different peer from peers 501a-501d that created the "block") generates a proof-of-work to validate the "block". That is, as described in block 711, each block is verified by the validator as containing a link to a previous block, thus making it able to be incorporated into the blockchain. More specifically, each new block is encrypted using information in the previous block in the blockchain, thus ensuring the security of the blockchain.

As described in block 713, the block (describing the newly created transaction) is then broadcast into the peer-to-peer network. As described in block 715, if two blocks attempt to validate the same transaction, then the largest blockchain is used. That is, two blockchains may be appropriate for incorporating the new block. If so, then the blockchain that is the largest will be given preference for receiving and incorporating the new block.

Thus, the actions performed in blocks 707, 709, and 713 are validator/miner actions (rather than user actions).

As shown in block 717, the user (i.e., the computer on which the browser is running) listens for new blocks from the peer-to-peer network, and merges them into local ledgers (i.e., records of transactions/actions/settings/etc.) on the computer.

As described herein, the presently-described blockchain-implemented system may be used to facilitate any of:

Lock In Attribution: The present system can create a permanent and unbreakable link between the user and his browsing information. That link—the record of browsing information—can be forever verified and tracked.

Securely Share: The present system can securely share a user's digital browsing information with others. Transferring browsing information is made as easy as transferring or copying a browsing information record.

Figure 8:
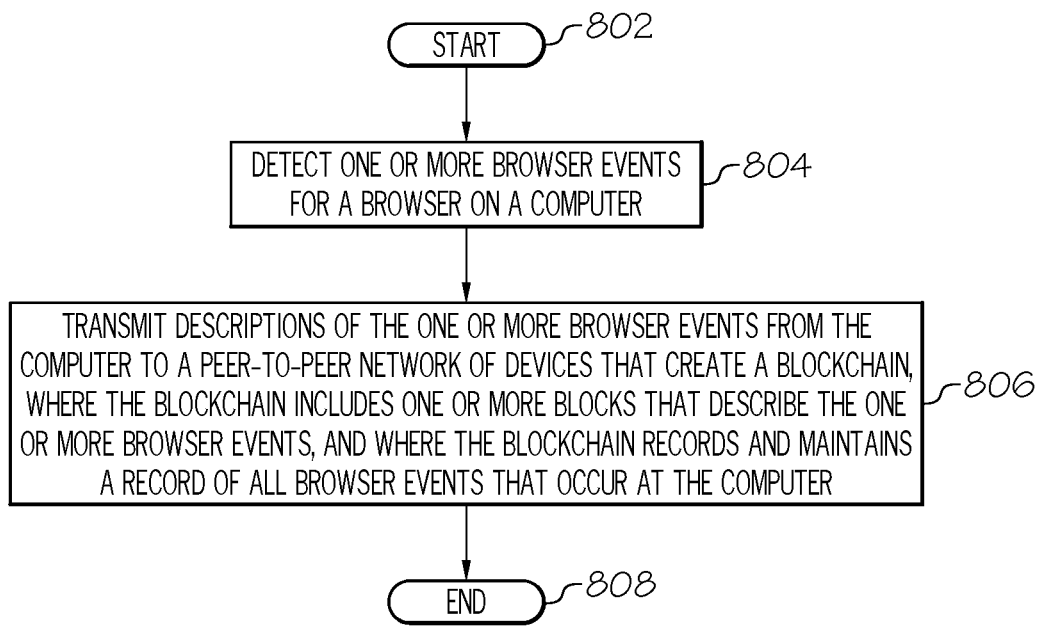
FIG. 8 is a high-level flow chart illustrating a process in accordance with one or more embodiments of the present invention.

With reference now to FIG. 8, a high-level flow chart illustrates a computer-implemented method for recording and maintaining a record of browser events in a blockchain in accordance with one or more embodiments of the present invention.

After initiator block 802, one or more processors (e.g., processor(s) 103 shown in FIG. 1) detect one or more browser events for a browser (e.g., browser 145 shown in FIG. 1) on a computer (e.g., computer 101 shown in FIG. 1), as described in block 804. These events may be retrieving a webpage, accepting a cookie, updating the browser, searching for a particular term on the World Wide Web, etc.).

As described in block 806, one or more processors then transmit transactions associated with one or more of the user's browser events from the computer to a peer-to-peer network of devices (e.g., peer-to-peer network 511 shown in FIG. 5) that create a blockchain (e.g., blockchain 513). As described herein, the blockchain includes one or more blocks that describe the one or more browser events for the browser on the computer, such that the blockchain records and maintains a record of browser events that occur at the computer. In one embodiment, the record is for all browser events that occur at the computer. In another embodiment, the record is for a portion of the browser events that occur at the computer.

The flow-chart ends at terminator block 808.

In an embodiment of the present invention, the computer-implemented method further comprises receiving, by the computer, the blockchain from the peer-to-peer network; and merging, by the computer, blocks from the blockchain into a ledger of browser events in the computer. That is, information found in the blocks of the blockchain can then be extracted and stored on local ledgers in the computer on which the browser events occurred.

In an embodiment of the present invention, the record of browser events maintained in the blockchain includes records of uniform resource locators (URLs) browsed by the browser, bookmarks added to the browser, and search terms searched by the browser.

In an embodiment of the present invention, the record of browser events maintained in the blockchain includes a record of cookies sent to the computer, wherein the cookie are files that hold data specific to the computer and websites visited by the computer.

In an embodiment of the present invention, the computer-implemented method further comprises adjusting a frequency of transmitting the descriptions of the one or more browser events from the computer to the description of the one or more events from the computer to the peer-to-peer network of devices according to a current location of the computer.

In an embodiment of the present invention, the computer-implemented method further includes adjusting, by one or more processors, a frequency of transmitting the transactions associated with one or more of the user's browser events from the computer to peer-to-peer network of devices according to types of webpages being browsed by the computer. For example, if the types of webpages being browsed (e.g., searched for and retrieved) contain highly transitory information (i.e., is scrubbed from this type of website every five minutes), and the browser events are retrieving this highly transitory information, then the blockchain may be updated (i.e., by "transmitting the transactions associated with one or more of the user's browser events from the computer to peer-to-peer network of devices") every minute, in order to ensure that the blockchain contains the highly transitory information.

In an embodiment of the present invention, the computer-implemented method further includes adjusting, by one or more processors, a frequency of transmitting the transactions associated with the one or more user's browser events from the computer to the transactions of the one or more events from the telecommunication device to the peer-to-peer network of devices according to types of webpages being browsed by the computer.

In an embodiment of the present invention, the computer-implemented method further comprises additional steps related to validating transactions. One or more processors obtain a historical block identifier from a browser historic blockchain that is representative of historical activities the user conducted with respect to the browser. That is, the browser historic block identifier identifies blocks in the blockchain that already exist (e.g., for a particular user). The processor(s) receive one or more validity requirements with respect to the user activities on the browser. That it, the activities of a particular user of the blockchain need to be valid (e.g., authorized, accurate, etc.) according to these validity requirements. As such, the processors obtain a validation token that is indicative of a validity of the user actions and is based on a set of browser tokens (which are representative of user or browser activities taken with respect to a browser (including critical APIs, browser extension APIs, etc.)) That is, the browser tokens may be based on inputs such as user generated queries (including user interactions with web browser interface), program/service execution results (e.g. vulnerability scanner, information flow analysis, malware detection tools, response to a user query, etc.), user cohort (e.g., which group the user belongs to) and context (e.g., what the user is doing at a particular time), and outputs (e.g., risk assessment such as data sensitivity, forecast of leaking sensitive information based on the browser plugin/extension). The processor(s) then compute the chaincode block for a transaction against the validation requirement. This computation is a function of the following browser parameters: the validation token, the historical browser's block identifier, and the set of browser tokens.

In an embodiment of the present invention, the computer-implemented method further includes performing, by one or more processors, a vulnerability analysis for the computer, where the vulnerability analysis determines how vulnerable the computer is to a malicious attack; and adjusting, by one or more processors, a frequency of transmitting the transactions associated with the one or more browser events (of the user) from the computer to the peer-to-peer network of devices according to how vulnerable the computer is to the malicious attack. That is, a vulnerability analysis for the browser/computer (i.e., the "browser vulnerability") may determine, based on the lack of a firewall for the computer, a history of the computer being vulnerable to attacks, defective browser plugins, risky security settings (e.g., setting security settings on the browser so low that the browser is susceptible to attacks), unauthorized browser helper objects, etc., that computer 101 (and thus the browser) is highly vulnerable to attacks. As such, the blockchain is updated more frequently ("frequency of transmitting the transactions associated with the one or more user's browser events from the computer to the peer-to-peer network of devices"), such that if the computer 101 is attacked, the blockchain will contain the most current browser history.

In an embodiment of the present invention, the peer-to-peer network selectively generates blocks to be incorporated into the blockchain for only predefined types of browser events that are received from the computer. For example, assume that peer-to-peer network 511 shown in FIG. 5 receives browser event information about 1) a history of web sites retrieved by the browser and 2) what cookies were stored by the browser. Peer-to-peer network 511 may be authorized to create blockchains that contain the search history (history of websites retrieved by the browser), but not to create a blockchain that contains cookie information. As such, peer-to-peer network 511 would create a blockchain for the search history, but would ignore the cookie information sent from the application process 503.

In an embodiment of the present invention, the computer-implemented method further includes transmitting, by one or more processors, the transaction associated with the one or more user's events to a validation module in the peer-to-peer network, where the one or more blocks are not added to the blockchain until the validation module validates the description of the one or more events and the one or more blocks, as described in FIG. 6.

While the present invention has been described primarily in the context of a peer-to-peer network creating the blockchain, a trans-vendor service may create the blockchain in one or more embodiments. This trans-vendor service is a service that 1) is able to receive information from different types of browsers, devices, operating systems, etc., and nonetheless still be able to 2) create a distributed ledger using blocks from these disparate systems/carriers. This allows the invention to create a blockchain that is not specific for a particular type of browser, but rather describes events that occur in various browsers on disparate computers using disparate operating systems etc. Thus, in an embodiment of the present invention, a computer-implemented method of tracking and maintaining a record of disparate browser events includes: detecting, by one or more processors, one or more browser events for a browser on a computer; and transmitting, by one or more processors, transactions associated with the one or more browser events of the user from the computer to a trans-vendor service, where the trans-vendor service operates across disparate browsers, devices, and operating systems, and wherein the trans-vendor service generates a distributed ledger that includes one or more blocks that include the transactions associated with the one or more browser events of the user from the computer and blocks that describe browser events from the disparate browsers, devices, and operating systems.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
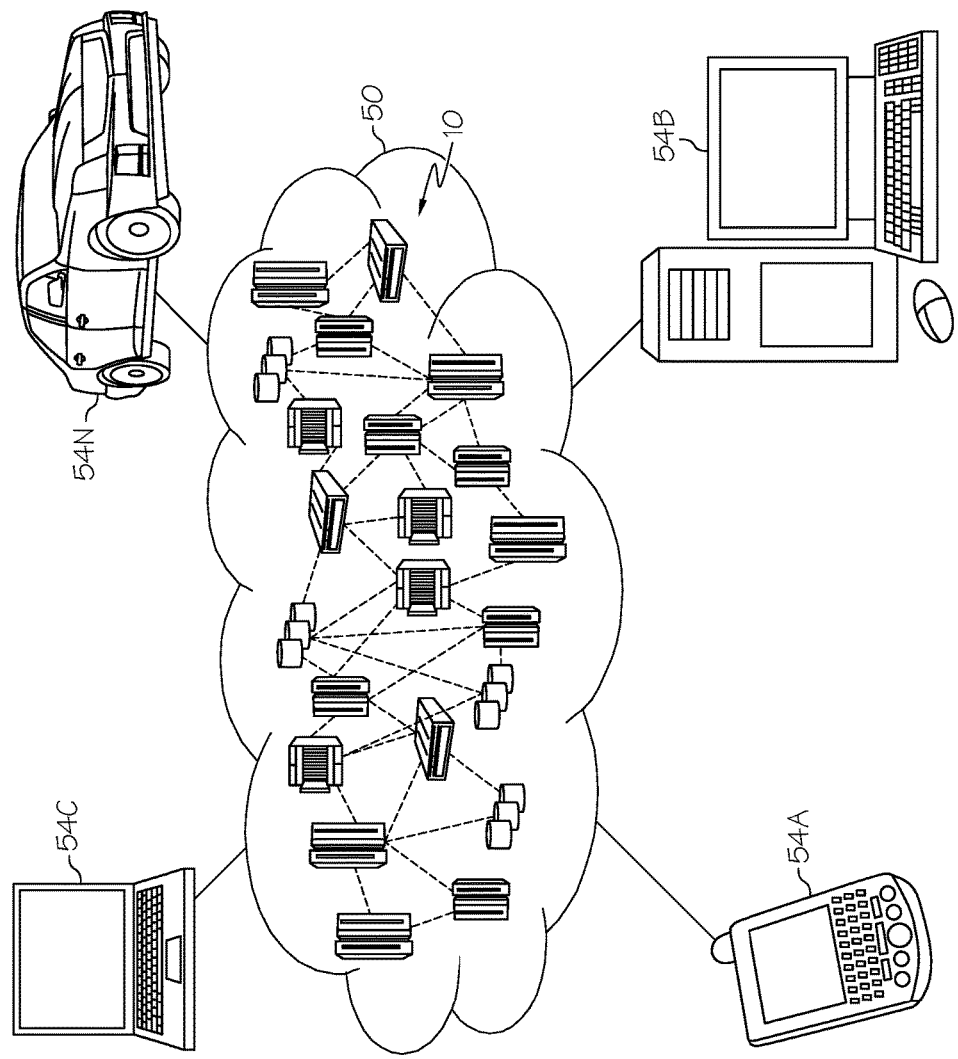
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
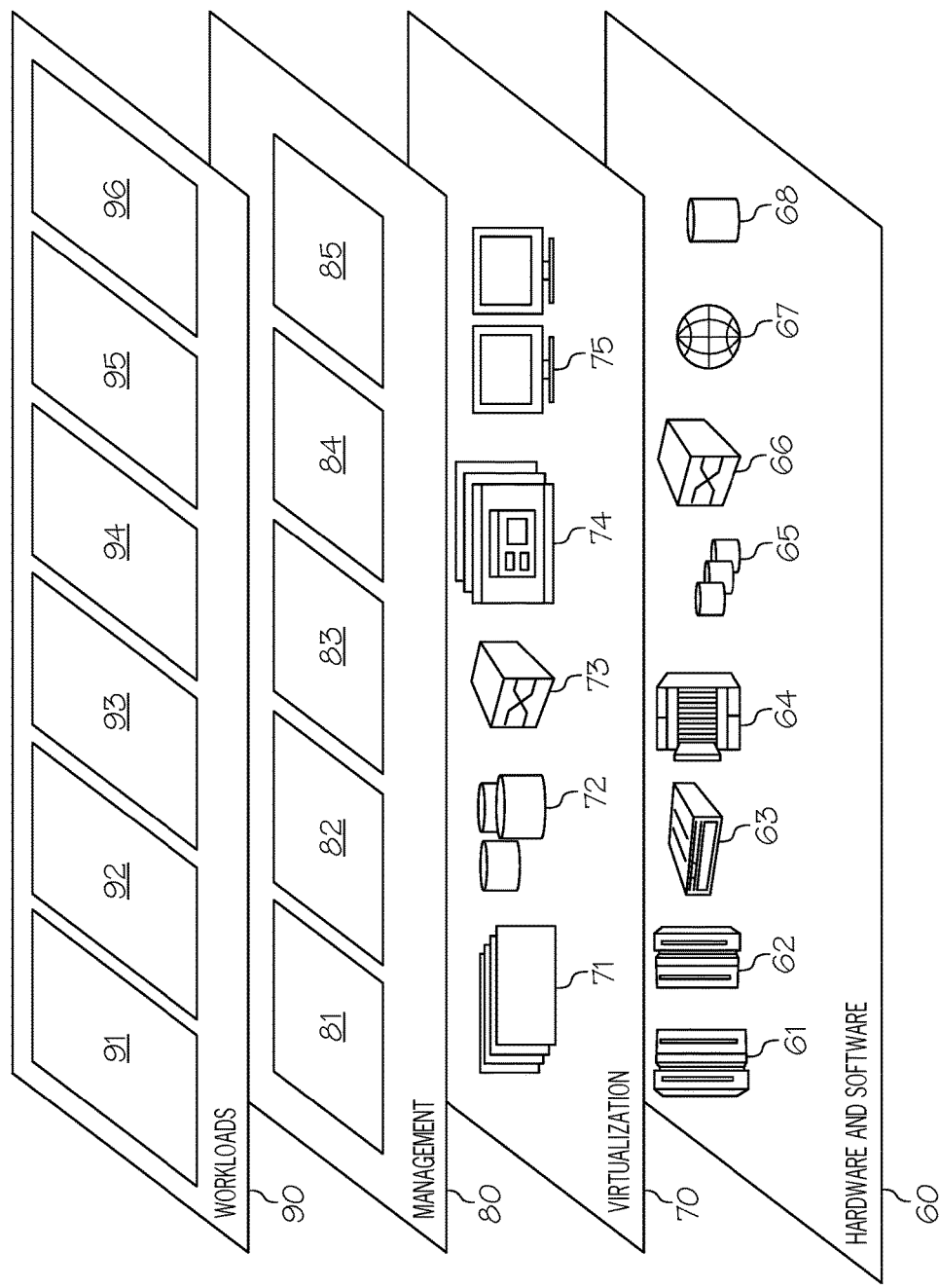
FIG. 10 depicts abstraction model layers of a cloud computing environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and browser event storage and maintenance processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of recording and maintaining a record of browser events in a blockchain, the computer-implemented method comprising:
   detecting, by one or more processors, one or more browser events for a browser on a computer;
   transmitting, by one or more processors, transactions associated with the one or more browser events from the computer to a peer-to-peer network of devices that create a blockchain, wherein the blockchain comprises one or more blocks that describe the one or more browser events for the browser on the computer, wherein the blockchain records and maintains a record of browser events that occur at the computer, wherein the record of browser events maintained in the blockchain comprises records of uniform resource locators (URLs) browsed by the user, bookmarks added to the browser, and search terms searched by the user, wherein the peer-to-peer network is a system of networked computers that are in communication with the browser, and wherein the blockchain is accessible to the computer on which the browser is operating in order to provide a private and secure copy of the browser events for the browser; and
   adjusting, by one or more processors, a frequency of transmitting the transactions associated with the one or more browser events from the computer to the peer-to-peer network of devices according to types of webpages being browsed by the computer, wherein webpages that contain highly transitory information of the browser events and that is scrubbed from the webpages at predefined intervals have their transactions sent to the peer-to-peer network at sub-intervals of the predefined intervals.

2. The computer-implemented method of claim 1, further comprising:
   receiving, by the computer, the blockchain from the peer-to-peer network; and
   merging, by the computer, blocks from the blockchain into a ledger of browser events in the computer.

3. The computer-implemented method of claim 1, wherein the record of browser events maintained in the blockchain comprises a record of security patches added to the browser.

4. The computer-implemented method of claim 1, wherein the record of browser events maintained in the blockchain comprises a record of cookies sent to the computer, wherein the cookies are files that hold data specific to the computer and websites visited by the computer.

5. The computer-implemented method of claim 1, further comprising:
   adjusting, by one or more processors, a frequency of transmitting the transactions associated with the one or more browser events from the computer to the peer-to-peer network of devices according to a current geolocation of the computer.

6. The computer-implemented method of claim 1, further comprising:
   performing, by one or more processors, a vulnerability analysis for the computer, wherein the vulnerability analysis determines how vulnerable the computer and the browser are to a malicious attack; and
   adjusting, by one or more processors, a frequency of transmitting the transactions associated with the one or more browser events from the computer to the peer-to-peer network of devices according to how vulnerable the computer and the browser are to the malicious attack.

7. The computer-implemented method of claim 1, wherein the peer-to-peer network selectively generates blocks to be incorporated into the blockchain for only predefined types of browser events that are extracted from the transactions associated with the one or more browser events that are received from the computer.

8. The computer-implemented method of claim 1, further comprising:
   transmitting, by one or more processors, the transactions that are associated with the one or more browser events to a validation module in the peer-to-peer network, wherein the one or more blocks are not added to the blockchain until the validation module validates the transactions that are associated with the one or more browser events.

9. The computer-implemented method of claim 1, further comprising:
   obtaining, by one or more processors, a historical block identifier from a browser historic blockchain representative of historical activities that the user conducted with respect to the browser;
   receiving, by one or more processors, one or more validation requirements with respect to the user activities on the browser;
   obtaining, by one or more processors, a validation token indicative of a validity of user actions of the user and based on a set of browser tokens comprising one or more inputs related to activities of the user; and
   computing, by one or more processors, a chaincode block for a transaction against said one or more validation requirements as a function of browser parameters that are based on the validation token, a historical browser's block identifier, and the set of browser tokens.

10. The computer-implemented method of claim 1, further comprising:
receiving, by one or more processors, a signal activating a blockchain enabling button on a toolbar on the computer, wherein transmitting the transactions that are associated with the one or more browser events from the computer to the peer-to-peer network of devices that create the blockchain is in response to receiving the signal activating the blockchain enabling button.

11. A computer program product for recording and maintaining a record of browser events in a blockchain, the computer program product comprising a non-transitory computer readable storage device having program instructions embodied therewith, the program instructions readable and executable by a computer to perform a set of steps, the steps comprising:
detecting one or more browser events for a browser on a computer;
transmitting descriptions of the one or more browser events from the computer to a peer-to-peer network of devices that create a blockchain, wherein the blockchain comprises one or more blocks that describe the one or more browser events, wherein the blockchain records and maintains a record of browser events that occur at the computer, wherein the record of browser events maintained in the blockchain comprises records of uniform resource locators (URLs) browsed by user bookmarks added to the browser and search terms searched by the user, wherein the peer-to-peer network is a system of networked computers that are in communication with the browser, and wherein the blockchain is accessible to the computer on which the browser is operating in order to provide a private and secure copy of the browser events for the browser; and
adjusting a frequency of transmitting the transactions associated with the one or more browser events from the computer to the peer-to-peer network of devices according to types of webpages being browsed by the computer, wherein webpages that contain highly transitory information of the browser events and that is scrubbed from the webpages at predefined intervals have their transactions sent to the peer-to-peer network at sub-intervals of the predefined intervals.

12. The computer program product of claim 10, wherein the steps further comprise:
receiving, by the computer, the blockchain from the peer-to-peer network; and
merging, by the computer, blocks from the blockchain into a ledger of browser events in the computer.

13. The computer program product of claim 10, wherein the record of browser events maintained in the blockchain comprises a record of a browser version of the browser.

14. The computer program product of claim 10, wherein the record of browser events maintained in the blockchain comprises a record of cookies sent to the computer, wherein the cookies are files that hold data specific to the computer and web sites visited by the computer.

15. The computer program product of claim 10, wherein the steps further comprise:
adjusting a frequency of transmitting the transactions that are associated with the one or more browser events from the computer to the peer-to-peer network of devices according to a current geolocation of the computer.

16. The computer program product of claim 10, wherein the steps further comprise:
performing a vulnerability analysis for the computer, wherein the vulnerability analysis determines how vulnerable the computer and the browser are to a malicious attack; and
adjusting a frequency of transmitting the transactions that are associated with the one or more browser events from the computer to the peer-to-peer network of devices according to how vulnerable the computer and the browser are to the malicious attack.

17. The computer program product of claim 10, wherein the peer-to-peer network selectively generates a block to be incorporated into the blockchain for only predefined types of browser events that are extracted from a transaction that is received from the computer.

18. A computer-implemented method of tracking and maintaining a record of disparate browser events, the computer-implemented method comprising:
detecting, by one or more processors, browser events for a browser on a computer, wherein the browser events comprises uniform resource locators (URLs) browsed by the browser, user bookmarks added to the browser by a user, and search terms searched by the user;
transmitting, by one or more processors, transactions that are associated with the browser events from the computer to a trans-vendor service, wherein the trans-vendor service operates across disparate browsers, devices, and operating systems, wherein the trans-vendor service generates a blockchain that comprises one or more blocks that comprise the transactions that are associated with the browser events from the computer and blocks that describe browser events from the disparate browsers, devices, and operating systems, wherein the trans-vendor service utilizes a system of networked computers that are in communication with the browser, and wherein the blockchain is accessible to the computer on which the browser is operating in order to provide a private and secure copy of the browser events for the browser to the computer; and
adjusting, by one or more processors, a frequency of transmitting the transactions associated with the browser events from the computer to the trans-vendor service according to types of webpages being browsed by the computer, wherein webpages that contain highly transitory information of the browser events and that is scrubbed from the webpages at predefined intervals have their transactions sent to the trans-vendor service at sub-intervals of the predefined intervals.

* * * * *